United States Patent
Nishimura et al.

(10) Patent No.: US 8,213,161 B2
(45) Date of Patent: Jul. 3, 2012

(54) SOLID ELECTROLYTIC CAPACITOR AND METHOD OF MANUFACTURING SAME

(75) Inventors: Koichi Nishimura, Kadoma (JP); Koji Endo, Hirakata (JP); Takashi Umemoto, Hirakata (JP); Hiroshi Nonoue, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 219 days.

(21) Appl. No.: 12/608,381

(22) Filed: Oct. 29, 2009

(65) Prior Publication Data

US 2010/0110615 A1    May 6, 2010

(30) Foreign Application Priority Data

Oct. 31, 2008  (JP) ................................ 2008-280825
Sep. 28, 2009  (JP) ................................ 2009-222842

(51) Int. Cl.
*H01G 4/228* (2006.01)
*H01G 9/00* (2006.01)
*H01G 9/145* (2006.01)

(52) U.S. Cl. ........ 361/540; 361/528; 361/538; 29/25.03
(58) Field of Classification Search .................. 361/540, 361/535, 533, 528

See application file for complete search history.

(56) References Cited

U.S. PATENT DOCUMENTS

| | | | |
|---|---|---|---|
| 6,464,739 B2 * | 10/2002 | Yoshida et al. | 29/25.03 |
| 6,775,127 B2 * | 8/2004 | Yoshida | 361/528 |
| 6,972,943 B2 * | 12/2005 | Kato et al. | 361/533 |
| 6,992,880 B2 * | 1/2006 | Tadanobu et al. | 361/523 |
| 7,031,141 B2 * | 4/2006 | Kuriyama | 361/528 |
| 7,450,366 B2 * | 11/2008 | Kuriyama | 361/523 |
| 7,511,944 B2 | 3/2009 | Kuriyama | |
| 7,646,584 B2 * | 1/2010 | Togashi | 361/303 |
| 7,787,235 B2 * | 8/2010 | Fujita et al. | 361/528 |
| 7,990,686 B2 * | 8/2011 | Matsuoka et al. | 361/540 |
| 2006/0285277 A1 * | 12/2006 | Hirata et al. | 361/528 |
| 2007/0159770 A1 * | 7/2007 | Kuriyama | 361/528 |
| 2008/0037201 A1 * | 2/2008 | Kuriyama | 361/528 |
| 2008/0259528 A1 * | 10/2008 | Fujita et al. | 361/528 |
| 2009/0080144 A1 * | 3/2009 | Matumoto et al. | 361/528 |
| 2009/0237866 A1 * | 9/2009 | Okada et al. | 361/528 |
| 2010/0073848 A1 * | 3/2010 | Kobayashi et al. | 361/528 |
| 2010/0259868 A1 * | 10/2010 | Fujii et al. | 361/540 |

FOREIGN PATENT DOCUMENTS

| | | | |
|---|---|---|---|
| JP | 2000-150305 A | 5/2000 | |
| JP | 2005-123505 A | 5/2005 | |

* cited by examiner

*Primary Examiner* — Eric Thomas
(74) *Attorney, Agent, or Firm* — Marvin A. Motsenbocker; Mots Law, PLLC

(57) ABSTRACT

A solid electrolytic capacitor according to the present invention comprises an anode body, an anode lead in contact with an outer surface of the anode body, a dielectric layer formed on a surface of the anode lead, and a cathode layer formed on a surface of the dielectric layer. The anode lead is provided with a plurality of openings passing through the anode lead. Another solid electrolytic capacitor according to the present invention comprises an anode body, an anode lead in contact with an outer surface of the anode body, a dielectric layer formed on a surface of the anode lead, and a cathode layer formed on a surface of the dielectric layer. The anode lead is provided with a cutout on an outer circumference edge of the anode lead.

7 Claims, 13 Drawing Sheets

SOLID ELECTROLYTIC CAPACITOR AND METHOD OF MANUFACTURING SAME

The applications Number 2008-280825 and 2009-222842, upon which this patent application is based, is hereby incorporated by reference.

BACKGROUND OF THE INVENTION

1. Field of the Invention

The present invention relates to solid electrolytic capacitors and a method of manufacturing same, particularly to a solid electrolytic capacitor characterized in a structure of a capacitor element.

2. Description of Related Art

In a conventional solid electrolytic capacitor, a porous sintered body, which is to be an anode body of a capacitor element, is prepared by molding a valve metal powder into a predetermined shape and then sintering a compact thereby obtained with a part of an anode lead embedded in the compact.

However, in the conventional solid electrolytic capacitor, adhesion between the anode body and the anode lead is poor, and therefore, it is possible that yield ratio decreases or leakage current increases.

In view of those problems, it has been proposed to provide a mesh electrode on a surface of the anode body instead of embedding the anode lead in the anode body. The adhesion between the mesh electrode (the anode lead) and the anode body thereby improves, and thereby the decrease in the yield ratio or the increase in equivalent series resistance (ESR) or the leakage current can be restricted.

However, in the conventional solid electrolytic capacitor, a dielectric layer is not formed on a surface of the mesh electrode, and therefore, improvement of high frequency characteristic of the equivalent series resistance (ESR) has been interrupted.

SUMMARY OF THE INVENTION

In view of above discussed problem, an object of the present invention is to provide a solid electrolytic capacitor which has excellent high frequency characteristic of the equivalent series resistance (ESR) and a manufacturing method thereof.

A first solid electrolytic capacitor according to the present invention comprises an anode body, an anode lead in contact with an outer surface of the anode body, a dielectric layer formed on a surface of the anode lead, and a cathode layer formed on a surface of the dielectric layer. The anode lead is provided with a plurality of openings passing through the anode lead.

Here, the surface of the anode lead includes inner wall surfaces of the openings provided to the anode lead, as well as an outer surface of the anode lead.

According to the first solid electrolytic capacitor described above, when forming a sintered body which is to be the anode body, the anode lead provided with the plurality of openings is in contact with the outer surface of the anode body, thereby coupling the anode body and the anode lead to each other in a highly adhesive state. Accordingly, the leakage current and the equivalent series resistance (ESR) are reduced compared to those of the conventional solid electrolytic capacitor.

In addition, the plurality of openings are provided to the anode lead, the dielectric layer is formed on the surface of the anode lead, an electrolyte layer is formed on the surface of the dielectric layer, and the cathode layer is formed on the surface of the electrolyte layer, and therefore, a plurality of capacity components which exhibit high flatness of the electrode are generated between the anode lead and the electrolyte layer. The high frequency characteristic of the ESR is improved by these capacity components.

The anode lead is placed between the anode body and the electrolyte layer. However, an electrolyte of the electrolyte layer formed on the anode lead can pass through the openings provided to the anode lead to penetrate inside of a hole of the anode body. Thus, the electrolyte layer is uniformly formed also on the surface of the dielectric layer formed on the inner wall surfaces of the hole of the anode body, and thereby the ESR is reduced.

A second solid electrolytic capacitor according to the present invention is the first solid electrolytic capacitor described above, wherein the anode lead comprises a metal mesh or a metal plate provided with a plurality of through-holes.

A third solid electrolytic capacitor according to the present invention is the first or second solid electrolytic capacitor described above, wherein the openings are arranged in a triangle lattice form.

According to the third solid electrolytic capacitor, distances between adjacent openings are uniform, and therefore, adhesion between the anode body and the anode lead is likely to be uniform at an interface between the anode body and the anode lead. Accordingly, the adhesion between the anode body and the anode lead can be enhanced.

A fourth solid electrolytic capacitor according to the present invention is any one of the first to third solid electrolytic capacitors described above, wherein a plurality of anode terminals are electrically connected to the abode lead, while a cathode terminal is electrically connected to the cathode layer. The solid electrolytic capacitor having a three terminal structure is thereby formed.

A fifth solid electrolytic capacitor according to the present invention is any one of the first to fourth solid electrolytic capacitors described above, wherein a ratio of a total area of the plurality of openings provided to the anode lead to an area of a region of the outer surface of the anode body with which the anode lead is in contact is 25% or higher and 90% or lower.

It is thereby possible to enhance the adhesion between the anode body and the anode lead and significantly reduce the leakage current.

A sixth solid electrolytic capacitor according to the present invention comprises an anode body, an anode lead in contact with an outer surface of the anode body, a dielectric layer formed on a surface of the anode lead, and a cathode layer formed on a surface of the dielectric layer. The anode lead is provided with a cutout on an outer circumference edge of the anode lead.

The surface of the anode lead includes an inner wall surface of the cutout provided to the anode lead, as well as the outer surface of the anode lead.

According to the sixth solid electrolytic capacitor described above, when preparing a sintered body which is to be the anode body, the anode lead which is provided with the cutout is in contact with the outer surface of the anode body, thereby coupling the anode body and the anode lead to each other in the highly adhesive state. Accordingly, the leakage current and the equivalent series resistance (ESR) are reduced compared to those of the conventional solid electrolytic capacitor.

In addition, the cutouts is provided to the anode lead, the dielectric layer is formed on the surface of the anode lead, an electrolyte layer is formed on the surface of the dielectric layer, and the cathode layer is formed on the surface of the electrolyte layer, and therefore, a plurality of capacity components which exhibit high flatness of the electrode are generated between the anode lead and the electrolyte layer. The high frequency characteristic of the ESR is improved by these capacity components.

The anode lead is placed between the anode body and the electrolyte layer. However, the electrolyte of the electrolyte layer formed on the anode lead can pass through the cutouts provided to the anode lead to penetrate inside of a hole of the anode body. Thus, the electrolyte layer can be uniformly formed also on the surface of the dielectric layer formed on the inner wall surface of the hole of the anode body, and thereby the ESR is reduced.

A seventh solid electrolytic capacitor according to the present invention is the sixth solid electrolytic capacitor described above, wherein a ratio of a total area of the cutout provided to the anode lead to an area of a region of the outer surface of the anode body with which the anode lead is in contact is 10% or higher and 75% or lower.

An eighth solid electrolytic capacitor according to the present invention is the seventh solid electrolytic capacitor described above, wherein said ratio of the total area of the cutout is 40% or higher and 60% or lower.

It is thereby possible to enhance the adhesion between the anode body and the anode lead and significantly reduce the leakage current.

A first method for manufacturing the solid electrolytic capacitor according to the present invention comprises the steps of forming an anode body including an outer surface with which an anode lead provided with a plurality of openings is in contact, forming a dielectric layer on a surface of the anode lead, and forming an electrolyte layer on a surface of the dielectric layer.

A second method for manufacturing the solid electrolytic capacitor according to the present invention comprises the steps of forming an anode body including an outer surface with which an anode lead provided with a cutout on an outer circumference edge thereof is in contact, forming a dielectric layer on a surface of the anode lead, and forming an electrolyte layer on a surface of the dielectric layer.

According to the solid electrolytic capacitor of the present invention, the high frequency characteristic of equivalent series resistance (ESR) is improved. According to the method for manufacturing the solid electrolytic capacitor of the present invention, it is possible to obtain a solid electrolytic capacitor having an excellent high frequency characteristic of equivalent series resistance (ESR).

BRIEF DESCRIPTION OF THE DRAWINGS

FIG. 9b is a perspective view for explaining the positional relation between the anode body and the anode lead of the solid electrolytic capacitor shown in FIG. 9a;

FIG. 10b is a perspective view for explaining the positional relation of the anode body, the anode lead, and an embedded anode lead of the solid electrolytic capacitor shown in FIG. 10a;

DETAILED DESCRIPTION OF THE PREFERRED EMBODIMENT

A preferred embodiment of the present invention is described in detail below with reference to the drawings.

First Embodiment

Figure 1:
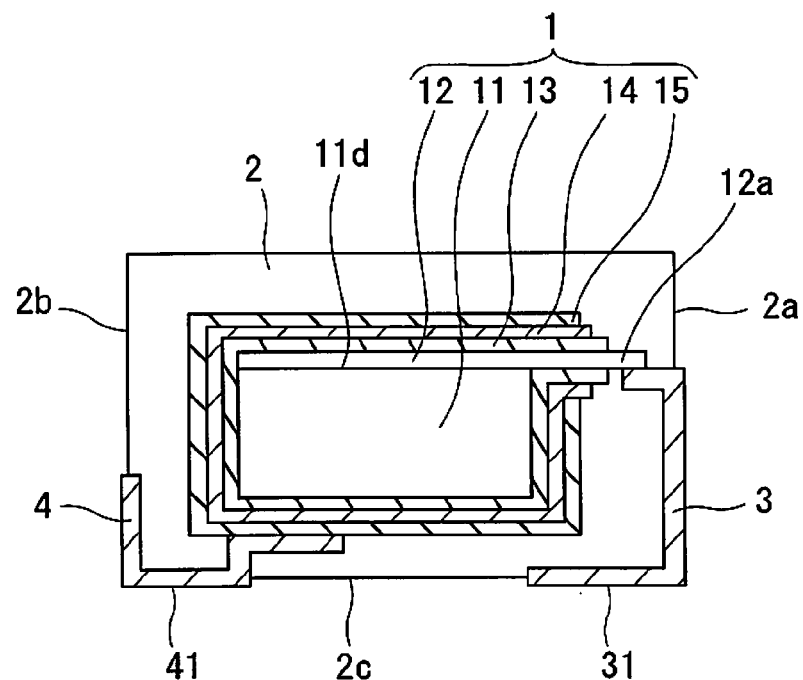
FIG. 1 is a cross-sectional view of a solid electrolytic capacitor according to a first embodiment of the present invention.

FIG. 1 is a cross-sectional view of a solid electrolytic capacitor according to a first embodiment of the present invention. As shown in FIG. 1, the solid electrolytic capacitor of this embodiment comprises a capacitor element 1, an exterior resin 2 covering the capacitor element 1, an anode terminal 3, and a cathode terminal 4. For the exterior resin 2, used is a resin material such as epoxy resin or the like.

As shown in FIG. 1, the capacitor element 1 comprises an anode body 11, an anode lead 12, a dielectric layer 13, an electrolyte layer 14, and a cathode layer 15. The anode body 11 comprises a porous sintered body formed by a valve metal. In this embodiment, the porous sintered body is formed in a rectangular parallelepiped shape (not shown).

As the valve metal, for example, tantalum, niobium, titanium, aluminum or the like can be used. However, the metals which can be used for the anode body 11 are not limited to those metals. Also, for the anode body 11, a foil-like base substance or the like can be used instead of the porous sintered body.

Figure 2:
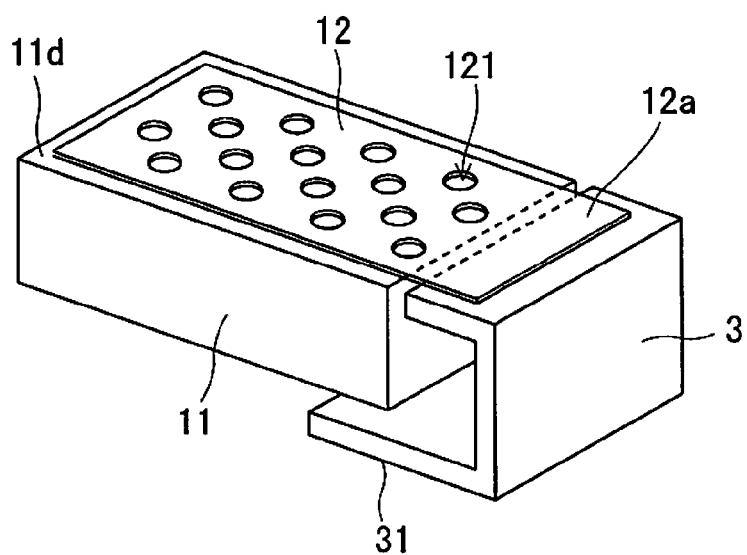
FIG. 2 is a perspective view of an anode body, an anode lead, and an anode terminal of the solid electrolytic capacitor.

FIG. 2 is a perspective view of the anode body 11, the anode lead 12, and the anode terminal 3 of the solid electrolytic capacitor of this embodiment. FIG. 2 shows the solid electrolytic capacitor of this embodiment without showing the dielectric layer 13, the electrolyte layer 14, the cathode layer 15, the exterior resin 2, or the cathode terminal 4. As shown in FIG. 2, the anode lead 12 is formed by a metal plate made of the valve metal provided with a plurality of through-holes 121 penetrating the anode lead 12 from a top surface to a bottom surface thereof. The plurality of through-holes 121 provided to the metal plate can be understood as a plurality of openings passing through the anode lead 12. The through-holes 121 are not shown in FIG. 1.

As the metal plate provided with the plurality of through-holes 121, used is a perforated metal plate, for example. Also, the valve metal is used as a material for said metal plate.

As shown in FIGS. 1 and 2, the bottom surface of the anode lead 12 is in contact with a top surface 11d of the anode body 11 to be used as the anode of the capacitor element 1. The anode terminal 3 and the anode body 11 are electrically connected to each other via the anode lead 12.

In particular, the anode lead 12 is in contact with most part of the largest surface (the top surface 11d) of outer surfaces of the anode body 11 formed by the porous sintered body having a rectangular parallelepiped shape. The plurality of through-holes 121 thereby open toward the anode body 11.

Figure 3A:
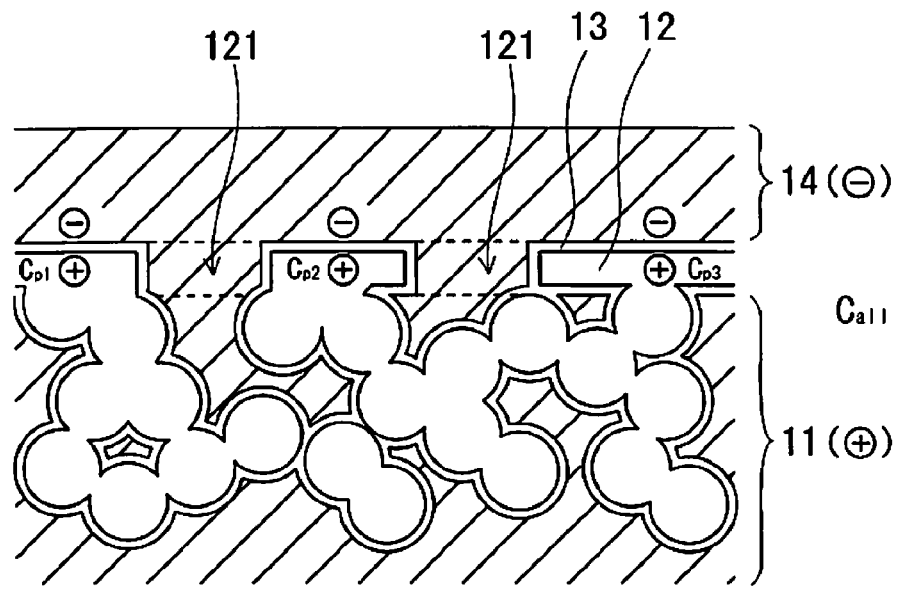
FIG. 3a is an enlarged cross-sectional view of a part of a capacitor element of the solid electrolytic capacitor.

FIG. 3a is an enlarged cross-sectional view of the anode lead 12 in contact with the anode body 11, and shows holes defined in the porous sintered body and the through-holes 121 of the anode lead 12, which are omitted in FIG. 1.

The anode body 11 and the anode lead 12 are formed in a manner described below. A valve metal powder is molded into a rectangular parallelepiped. And then, the metal plate provided with the through-holes 121 comes into contact with a top surface of a compact thereby obtained, and the compact is sintered in this state. The porous sintered body which is to be the anode body 11 is thereby formed, and also, thereby obtained is a sintered body including the metal plate which is to be the anode lead 12 coupled to a top surface of the porous sintered body in a highly adhesive state (see FIG. 3a). The highly adhesive state includes a state in which the anode body 11 and the anode lead 12 are integrated by sintering as shown in FIG. 3a.

In the solid electrolytic capacitor of this embodiment, in order to further enhance the adhesion between the anode body 11 and the anode lead 12, the through-holes 121 are arranged in a triangular lattice form as shown in FIG. 2. Therefore, distances between adjacent through-holes 121 are uniform, and as a result, the adhesion between the anode body 11 and the anode lead 12 is likely to be uniform at an interface between the anode body 11 and the anode lead 12. Accordingly, the adhesion between the anode body 11 and the anode lead 12 thereby improves.

The dielectric layer 13 comprises an oxide layer formed by oxidizing surfaces of the anode body 11 and the anode lead 12. In particular, the anode body 11 with the outer surface of which the anode lead 12 is in contact is immersed in an electrolytic solution such as a phosphoric acid aqueous solution or the like, so that the surfaces of the anode body 11 and the anode lead 12 touch the electrolytic solution to be electrochemically oxidized (anodic oxidation) to form the oxide layer which forms the dielectric layer 13 on the surfaces of the anode body 11 and the anode lead 12. The dielectric layer 13 is formed on the surfaces of the anode body 11 and the anode lead 12 exposed in the state where the anode lead 12 is in contact with the outer surface of the anode body 11 in such a manner. FIG. 1 schematically shows the dielectric layer 13 formed on the surface of the anode body 11 on the outer surface side and the surface of the anode lead 12.

As described above, FIG. 1 does not show the holes of the porous sintered body or the through-holes 121 of the anode lead 12, and therefore, FIG. 1 does not show the dielectric layer formed on inner wall surfaces of the holes of the porous sintered body or inner wall surfaces of the through-holes 121 of the anode lead 12, either.

By immersing the anode body 11 in the electrolytic solution, the electrolytic solution passes through the through-holes 121 defined in the anode lead 12 to penetrate inside of the holes of the porous sintered body forming the anode body 11. Therefore, as shown in FIG. 3a, the dielectric layer 13 is formed also on the inner wall surfaces of the through-holes 121 defined in the anode lead 12, which are the surface of the anode lead 12, and on the inner wall surfaces of the holes of the porous sintered body forming the anode body 11, which are the surface of the anode body 11.

As shown in FIG. 1, the dielectric layer 13 is not formed on an end part 12a of the anode lead 12 to which the anode terminal 3 is connected.

The electrolyte layer 14 is formed by a conductive inorganic material, a TCNQ (Tetracyano-quinodimethane) complex salt, a conductive polymer or the like, and formed on a surface of the dielectric layer 13. For the conductive inorganic material, used is manganese dioxide or the like, and for the conductive polymer, used is polyethylenedioxythiophene, polypyrrole, polythiophene, polyaniline or the like. The electrolyte layer 14 may be formed by either a single layer or multiple layers. In the case where the electrolyte layer 14 is formed by multiple layers, each of the layers can be formed by different material.

By forming the electrolyte layer 14 on the surface of the dielectric layer 13 as shown in FIG. 1, an electrolyte penetrates inside of the holes of the porous sintered body forming the anode body 11 as shown in FIG. 3a to form the electrolyte layer also on a surface of the oxide layer formed on the inner walls of the holes. The anode lead 12 is provided with the plurality of through-holes 121, i.e. a plurality of openings passing through an area sandwiched by the anode body 11 and the electrolyte layer 14, and therefore, the electrolyte of the electrolyte layer 14 formed on the anode lead 12 penetrates inside of the holes of the porous sintered body through the plurality of openings.

In FIG. 3a, the electrolyte layer 14 is formed so as to have a great thickness, and therefore, the through-holes 121 are filled with the electrolyte. However, this is not a limitation to the present invention. For example, the electrolyte layer 14 may be formed so as to have a small thickness as long as the electrolyte covers the surface of the dielectric layer 13 formed on the inner wall surfaces of the holes of the porous sintered body forming the anode body 11 and the inner wall surfaces of the through-holes 121.

The cathode layer 15 is formed by a carbon layer formed on a surface of the electrolyte layer 14 and a silver paste layer formed on a surface of the carbon layer, and is electrically connected to the electrolyte layer 14. The carbon layer is formed by applying a carbon paste to the surface of the electrolyte layer 14 and then drying it. The silver paste layer is formed by applying a silver paste to the surface of the carbon layer and then drying it.

As shown in FIGS. 1 and 2, the anode terminal 3 is connected to the end part 12a of the anode lead 12 which is used as the anode, and extends to a front surface 2a of the exterior resin 2. The anode terminal 3 extends along the front surface 2a of the exterior resin 2 and extends to a bottom surface 2c of the exterior resin 2, and therefore, an anode terminal surface 31 is exposed from the bottom surface 2c of the exterior resin 2.

The cathode terminal 4 is connected to the cathode layer 15 which is used as the cathode, and extends to the bottom surface 2c of the exterior resin 2, and a cathode terminal surface 41 of the cathode terminal 4 is exposed from the bottom surface 2c of the exterior resin 2. The cathode terminal 4 extends also to a rear surface 2b of the exterior resin 2.

In the solid electrolytic capacitor described above, the adhesion between the anode body 11 and the anode lead 12 is enhanced, and therefore, the anode terminal 3 connected to the anode lead 12 and the anode body 11 are in a preferable connection state. Accordingly, the leakage current and the equivalent series resistance (ESR) are reduced compared to those of the conventional solid electrolytic capacitor.

By providing the through-holes 121 to the anode lead 12, dispersed is a strain generated when connecting the anode body 11 and the anode lead 12 to each other, and as a result, an adhesive force between the anode body 11 and the anode lead 12 increases.

Further, when forming the exterior resin 2 or mounting the solid electrolytic capacitor, even if heat is applied to and thereby a stress is generated on the anode lead 12, since the through-holes 121 are provided to the anode lead 12, the stress can be relaxed. Therefore, a defect or the like hardly occurs on the dielectric layer 13, resulting in the decrease in the leakage current.

In the solid electrolytic capacitor described above, the dielectric layer 13 is formed on the surface of the anode lead 12, the electrolyte layer 14 is formed on the surface of the dielectric layer 13, and the cathode layer 15 is formed on the surface of the electrolyte layer 14. Therefore, as shown in FIG. 3a, a capacity component $C_{all}$ is generated by the dielectric layer 13 formed on the surface of the anode body 11 formed by the porous sintered body between the entire anode body 11 and anode lead 12 which are the anode and the entire electrolyte layer 14 which is the cathode. Also, between the anode lead 12 and the electrolyte layer 14, a plurality of capacity components $C_{p1}, C_{p2}, \ldots,$ and $C_{pn}$ which exhibit high flatness of the electrode are generated by the dielectric layer 13 formed on the surface of the anode lead 12.

Figure 3B:
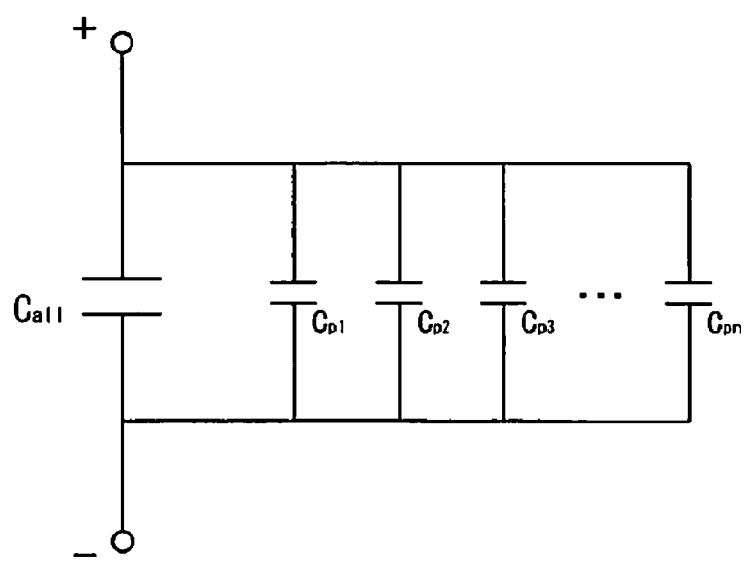
FIG. 3b is an equivalent circuit schematic of the capacitor element.

FIG. 3b is an equivalent circuit schematic of the capacitor element 1 regarding the capacity components described above. As shown in FIG. 3b, the plurality of capacity components $C_{p1}, C_{p2}, \ldots,$ and $C_{pn}$ are arranged in parallel with the capacity component $C_{all}$.

The plurality of capacity components $C_{p1}, C_{p2}, \ldots,$ and $C_{pn}$ generated on the surface of the anode lead 12 exhibit higher flatness of the electrode compared to the plurality of capacity components $C_{p1}, C_{p2}, \ldots,$ and $C_{pn}$ generated on the surface of the anode body 11 formed by the porous sintered body. Therefore, the ESL (equivalent series inductance) of the capacity components $C_{p1}, C_{p2}, \ldots,$ and $C_{pn}$ is small, and the solid electrolytic capacitor as a whole has an excellent high frequency characteristic. Thus, in the solid electrolytic capacitor of this embodiment, the high frequency characteristic of the ESR is improved by the plurality of capacity components $C_{p1}, C_{p2}, \ldots,$ and $C_{pn}$ which exhibit high flatness of the electrode.

As long as the flatness of the electrode of the capacity components $C_{p1}, C_{p2}, \ldots,$ and $C_{pn}$ is higher than the flatness of the surface of the porous sintered body, even if the difference is not significant, it is possible to obtain the similar effect.

Further, in the solid electrolytic capacitor described above, the electrolyte of the electrolyte layer 14 formed on the anode lead 12 passes through the through-holes 121 of the anode lead 12 to penetrate inside of the anode body 11 formed by the porous sintered body, and therefore, the electrolyte layer is uniformly formed also on the surface of the dielectric layer formed inside the porous sintered body as shown in FIG. 3a. Thus, the ESR can be reduced compared to that in the case where the through-holes 121 are not defined in the anode lead 12, or the case where the through-holes 121 are blocked by an insulating material or the like.

In the solid electrolytic capacitor of this embodiment, as shown in FIG. 2, the anode lead 12 is arranged so as to cover most of the top surface 11d of the anode body 11, thereby enhancing the above described effect.

Tables 1 and 2 show results of an experiment for optimizing the solid electrolytic capacitor described above. In this optimization experiment, prepared were 20 each of samples A1 to A7 and samples B1 to B6 of the solid electrolytic capacitor of this embodiment shown in FIGS. 1 and 2, and comparative samples X. For each of the samples, measured were capacitance, leakage current, ESR, and yield ratio.

Here, the capacitance was measured with an alternating voltage of 100 mV being applied to the samples at a frequency of 120 Hz. The leakage current was obtained by measuring a current flowing one minute after starting applying a direct-current voltage of 2.5 V to the samples. The ESR was measured at a frequency of 100 kHz. The yield ratio was obtained by dividing the number of non-defective products by the total number of samples (20). The number of non-defective products was obtained by subtracting the number of defective products such as products damaged in manufacturing, products which short circuited or the like from the total number of samples. The capacitance, leakage current, and ESR shown in Tables 1 and 2 were obtained by normalizing the average values of the non-defective products by the capacitance, leakage current, and ESR of the comparative samples X. Accordingly, as the capacitance becomes higher than one, or as the leakage current and ESR become lower than one, the properties improve.

The samples A1 to A1 and B1 to B6 were prepared as described below.

First, a powder of niobium metal having an average particle diameter of around 2 μm was mixed with a powder of camphor and agitated. Thereafter the mixed powder was molded into a rectangular parallelepiped having a thickness of 2 mm, a width of 8 mm, and a length of 10 mm. A perforated metal plate made of niobium came into contact with a top surface of a compact thereby obtained, and the compact was sintered in this state. Thereby formed was a porous sintered body (the anode body 11) with the perforated metal plate (the anode lead 12) in contact with the top surface thereof.

Next, the porous sintered body described above was immersed in phosphoric acid aqueous solution (around 0.5 wt %) maintained at around 60 degrees Celsius and a voltage of 10 V was applied for eight hours to form an oxide layer to be the dielectric layer 13 on surfaces of the porous sintered body and the perforated metal plate.

And then, the electrolyte layer 14 formed by polypyrrole was formed on the surface of the dielectric layer 13 by chemical polymerization method. Thereafter, the carbon layer and the silver paste layer (the cathode layer 15) were formed by applying and drying the carbon paste and the silver paste in the order. Thus, prepared was the capacitor element 1 to be included in the samples A1 to A7 and samples B1 to B6.

By bonding the cathode terminal 4 to the cathode layer 15 of the prepared capacitor element 1 by means of an electrically-conductive adhesive, the cathode layer 15 and the cathode terminal 4 were electrically connected to each other. Also, by welding the anode terminal 3 to a part of the perforated metal plate (the anode lead 12), the perforated metal plate and the anode terminal 3 were electrically connected to each other. Thereafter the exterior resin 2 was formed by covering the capacitor element 1 with a sealing member.

In the samples A1 to A7, the perforated metal plate has a thickness of 0.1 mm, and the through-holes 121 provided to the perforated metal plate has a diameter of 1 mm. A ratio of a total area of the plurality of through-holes 121 defined in the perforated metal plate to an area of a region of the outer surface of the anode body 11 with which the perforated metal plate is in contact (including the area of the plurality of through-holes 121) is hereinafter referred to as an aperture ratio. The aperture ratio is 20% in the sample A1, 25% in the sample A2, 40% in the sample A3, 60% in the sample A4, 80% in the sample A5, 90% in the sample A6, and 92% in the sample A7. Here, a hexagonal grid-type perforated metal plate is used in the samples A6 and A7.

In the samples B1 to B6, the through-holes 121 provided to the perforated metal plate have a diameter of 1 mm, and the aperture ratio is 60%. The thickness of the perforated metal plate is 1.5 mm in the sample B1, 1 mm in the sample B2, 0.5 mm in the sample B3, 0.1 mm in the sample B4, 0.01 mm in the sample B5, and 0.005 mm in the sample B6. Here, the sample B4 and the sample A4 are identical.

The comparative samples X were prepared in the same manner as when the samples A1 to A7 and samples B1 to B6 were prepared. However, in the comparative samples X, instead of the perforated metal plate, used was a metal plate (thin plate) having a thickness of 0.1 mm without the through-holes.

Results of the experiment of the samples A1 to A7 are discussed below.

The experiment result of the sample A1 shown in Table 1 shows that the ESR of the sample A1 is lower than that of the comparative samples X. It can be thought that this is because the electrolyte of the electrolyte layer 14 passes through the through-holes 121 of the perforated metal plate to penetrate inside of the anode body 11 formed by the porous sintered body, and as a result, the electrolyte layer is uniformly formed on the surface of the dielectric layer formed inside the porous sintered body.

The experiment result of the samples A2 to A6 shows that when the aperture ratio of the perforated metal plate is 25% or higher and 90% or lower, the capacitance is higher compared to that of the comparative samples X. It can be thought that this is because a greater surface area of the anode lead 12 was obtained due to the higher aperture ratio of the perforated metal plate.

The experiment result of the samples A2 to A6 shows that when the aperture ratio of the perforated metal plate is 25% or higher and 90% or lower, the leakage current and the ESR are lower compared to those of the comparative samples X. It can be thought that this is because an improved adhesion between the perforated metal plate and the anode body 11 was obtained due to the higher aperture ratio of the perforated metal plate.

The reason of the lower leakage current also includes the fact that it was easier for the stress generated on the perforated metal plate in the manufacturing process to be relaxed due to the higher aperture ratio of the perforated metal plate, and as a result, the defect hardly occurred on the dielectric layer 13.

The reason of the lower ESR also includes the fact that due to the higher aperture ratio of the perforated metal plate increases, it was easier for the electrolyte of the electrolyte layer 14 to pass through the through-holes 121 of the perforated metal plate to penetrate inside of the anode body 11 formed by the porous sintered body, and as a result, it became easier for the electrolyte layer to be uniformly formed on the surface of the dielectric layer formed inside the porous sintered body.

Further, the experiment result of the samples A2 to A6 shows that as the aperture ratio of the perforated metal plate increases, values of the leakage current and the ESR are reduced.

The experiment result of the sample A7 shows that even in the case where the aperture ratio of the perforated metal plate is higher than 90%, the leakage current and the ESR are lower compared to those of the comparative samples X in a similar manner in the samples A3 to A6. However, the result also shows that in the case where the aperture ratio of the perforated metal plate is higher than 90%, the yield ratio is significantly lower compared to that of the comparative samples X. It can be thought that this is because the strength of the perforated metal plate itself decreased, and as a result, the perforated metal plate was deformed by a mechanical load generated in the manufacturing process of the solid electrolytic capacitor.

TABLE 1

|  | APERTURE RATIO (%) | CAPACITANCE | LEAKAGE CURRENT | ESR | YIELD RATIO |
| --- | --- | --- | --- | --- | --- |
| SAMPLE A1 | 20 | 1.0 | 1.0 | 0.95 | 0.9 |
| SAMPLE A2 | 25 | 1.1 | 1.0 | 0.9 | 0.9 |
| SAMPLE A3 | 40 | 1.1 | 0.9 | 0.9 | 0.95 |
| SAMPLE A4 | 60 | 1.1 | 0.9 | 0.8 | 0.9 |
| SAMPLE A5 | 80 | 1.15 | 0.85 | 0.8 | 0.9 |
| SAMPLE A6 | 90 | 1.1 | 0.85 | 0.75 | 0.9 |
| SAMPLE A7 | 92 | 1.1 | 0.85 | 0.75 | 0.6 |
| COMPARATIVE SAMPLE X | 0 | 1.0 | 1.0 | 1.0 | 0.9 |

Results of the experiment of the samples B1 to B6 are discussed below.

The experiment result of the sample B1 shown in Table 2 shows that in the case where the perforated metal plate has the thickness of 1.5 mm or greater, the ESR is lower compared to that of the comparative samples X, however, the leakage current is higher compared to that of the comparative samples X. It can be thought that this is because the adhesion between the perforated metal plate and the anode body 11 decreased. Thus, the result shows that in the case where the perforated metal plate is too thick, the adhesion between the perforated metal plate and the anode body 11 decreases.

The experiment result of the samples B2 to B5 shows that when the thickness of the perforated metal plate is 1 mm or smaller and 0.01 mm or greater, the leakage current and the ESR are lower compared to those of the comparative samples X. It can be thought that this is because the thickness of the perforated metal plate became 1 mm or smaller, thereby improving the adhesion between the perforated metal plate and the anode body 11.

The experiment result of the sample B6 shows that even in the case where the thickness of the perforated metal plate is smaller than 0.01 mm, the leakage current and the ESR are lower compared to those of the comparative samples X in a similar manner in the samples B2 to B5. However, the result also shows that in the case where the thickness of the perforated metal plate is smaller than 0.01 mm, the yield ratio is significantly lower compared to that of the comparative samples X. It can be thought that this is because the strength of the perforated metal plate itself decreased, and as a result, the perforated metal plate was deformed by the mechanical load generated in the manufacturing process of the solid electrolytic capacitor.

TABLE 2

| | THICKNESS (mm) | CAPACITANCE | LEAKAGE CURRENT | ESR | YIELD RATIO |
|---|---|---|---|---|---|
| SAMPLE B1 | 1.5 | 1.0 | 1.1 | 0.8 | 0.9 |
| SAMPLE B2 | 1 | 1.0 | 0.9 | 0.8 | 0.9 |
| SAMPLE B3 | 0.5 | 1.1 | 0.85 | 0.7 | 0.9 |
| SAMPLE B4 | 0.1 | 1.1 | 0.9 | 0.8 | 0.95 |
| SAMPLE B5 | 0.01 | 1.1 | 0.85 | 0.8 | 0.9 |
| SAMPLE B6 | 0.005 | 1.0 | 0.85 | 0.95 | 0.75 |
| COMPARATIVE SAMPLE X | 0.1 | 1.0 | 1.0 | 1.0 | 0.9 |

Figure 4:
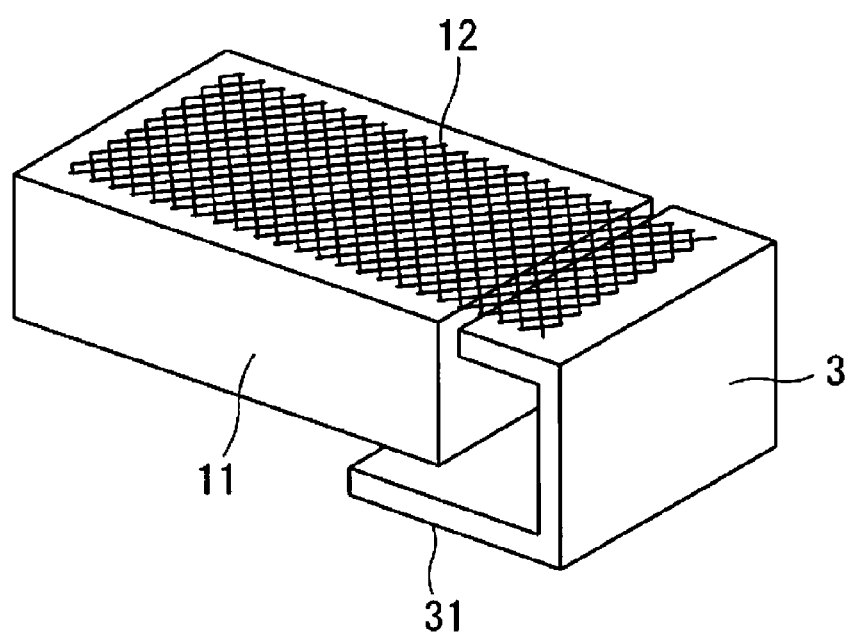
FIG. 4 is a perspective view of the anode body, the anode lead, and the anode terminal of a first modification of the solid electrolytic capacitor.

FIG. 4 is a perspective view of a first modification of the solid electrolytic capacitor described above, and shows the first modification of the solid electrolytic capacitor without showing the dielectric layer 13, the electrolyte layer 14, the cathode layer 15, the exterior resin 2, or the cathode terminal 4. In the first modification, the metal plate provided with the plurality of through-holes 121 is replaced with a metal mesh shown in FIG. 4 for the anode lead 12 in the solid electrolytic capacitor described above. A plurality of meshes defined in the metal mesh are included in the plurality of openings passing through the anode lead 12 as well as the plurality of through-holes 121 defined in the metal plate.

According to the first modification of the solid electrolytic capacitor, it is possible to reduce the leakage current and the equivalent series resistance (ESR) compared to those of the conventional solid electrolytic capacitor in a similar manner to in the solid electrolytic capacitor described above.

In the first modification also, the dielectric layer 13 is formed on the surface of the metal mesh which is the anode lead 12, the electrolyte layer 14 is formed on the surface of the dielectric layer 13, and the cathode layer 15 is formed on the surface of the electrolyte layer 14. Therefore, as shown in FIG. 3*a*, between the anode lead 12 and the electrolyte layer 14, generated are the plurality of capacity components $C_{p1}$, $C_{p2}$, ..., and $C_{pn}$ which exhibit higher flatness of the electrode than the surface of the porous sintered body. Therefore, in the first modification of the solid electrolytic capacitor also, the high frequency characteristic of the ESR is improved by the plurality of capacity components $C_{p1}$, $C_{p2}$, ..., and $C_{Pn}$ which exhibit high flatness of the electrode.

As long as the flatness of the electrode of the capacity components $C_{p1}$, $C_{p2}$, ..., and $C_{pn}$ is higher than the flatness of the surface of the porous sintered body, even if the difference is not significant, it is possible to obtain the similar effect.

Further, in the first modification also, electrolyte of the electrolyte layer 14 passes through the meshes defined in the metal mesh which is the anode lead 12 to penetrate inside of the anode body 11 formed by the porous sintered body. Accordingly, as shown in FIG. 3*a*, the electrolyte layer is uniformly formed also on the surface of the dielectric layer formed inside the porous sintered body, resulting in the decrease in the ESR.

Table 3 shows results of an experiment for optimizing the first modification of the electrolytic capacitor. In this optimization experiment, prepared were 20 each of samples C1 to C7 of the solid electrolytic capacitor. The samples C1 to C7 were prepared in the same manner as when the samples A1 to A7 were prepared but using a metal mesh formed by niobium wire as the anode lead 12.

Here, the niobium wire has a diameter of 1.5 mm in the sample C1, 1 mm in the sample C2, 0.5 mm in the sample C3, 0.1 mm in the sample C4, 0.05 mm in the sample C5, 0.025 mm in the sample C6, and 0.02 mm in the sample C7.

For each of the samples C1 to C7 described above, measured were the capacitance, leakage current, ESR, and yield ratio. The measuring conditions of the capacitance, leakage current, ESR, and yield ratio are the same as those in the measurement for the samples A1 to A7.

The result shows that, as shown in Table 3, when the diameter of the niobium wire is 0.025 mm or greater and 1 mm or smaller, the leakage current and the ESR are significantly lower compared to those of the comparative samples X. It can be thought that this is because the improved adhesion between the metal mesh and the anode body 11 was obtained due to the thinner niobium wire.

The reason of the lower leakage current also includes the fact that it was easier for the stress generated on the metal mesh in the manufacturing process to be relaxed due to the thinner niobium wire, and as a result, the defect hardly occurred on the dielectric layer 13.

The reason of the lower ESR also includes the fact that the smaller number of holes of the porous sintered body which were blocked by the metal mesh due to the thinner niobium wire, so that it was easier for the electrolyte of the electrolyte layer 14 to penetrate inside of the porous sintered body, and as a result, it became easier for the electrolyte layer to be uniformly formed on the surface of the dielectric layer formed inside the porous sintered body.

The experiment result of the sample C7 shows that even in the case where the diameter of the niobium wire is smaller than 0.025 mm, the value of the leakage current is lower compared to that of the comparative samples X in a similar manner to the samples C2 to C6. However, the result also shows that in the case where the diameter of the niobium wire is smaller than 0.025 mm, the yield ratio is significantly lower compared to that of the comparative samples X. It can be thought that this is because the strength of the metal mesh itself decreased, and as a result, the metal mesh was deformed by the mechanical load generated in the manufacturing process of the solid electrolytic capacitor.

TABLE 3

| | DIAMETER (mm) | CAPACITANCE | LEAKAGE CURRENT | ESR | YIELD RATIO |
|---|---|---|---|---|---|
| SAMPLE C1 | 1.5 | 0.8 | 1.0 | 0.8 | 0.8 |
| SAMPLE C2 | 1 | 1.0 | 0.9 | 0.7 | 0.9 |
| SAMPLE C3 | 0.5 | 1.1 | 0.85 | 0.7 | 0.9 |
| SAMPLE C4 | 0.1 | 1.1 | 0.8 | 0.7 | 0.95 |
| SAMPLE C5 | 0.05 | 1.2 | 0.75 | 0.8 | 0.9 |
| SAMPLE C6 | 0.025 | 1.1 | 0.75 | 0.9 | 0.9 |
| SAMPLE C7 | 0.02 | 1.1 | 0.8 | 1.0 | 0.6 |

TABLE 3-continued

| | DIAMETER (mm) | CAPACITANCE | LEAKAGE CURRENT | ESR | YIELD RATIO |
|---|---|---|---|---|---|
| COMPARATIVE SAMPLE X | | 1.0 | 1.0 | 1.0 | 0.9 |

Figure 5A:
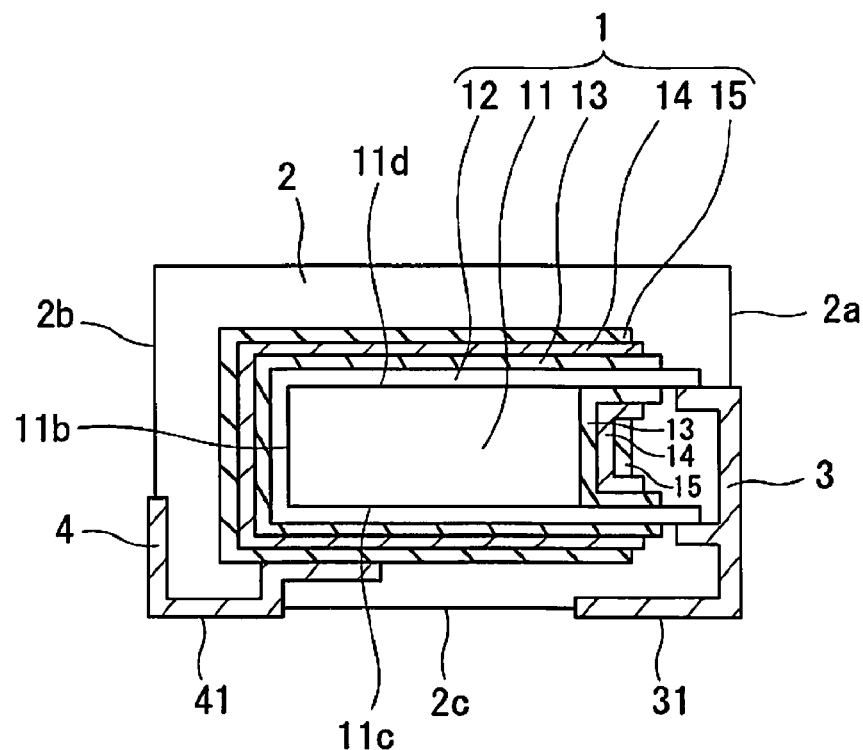
FIG. 5a is a cross-sectional view of a second modification of the solid electrolytic capacitor.
Figure 5B:
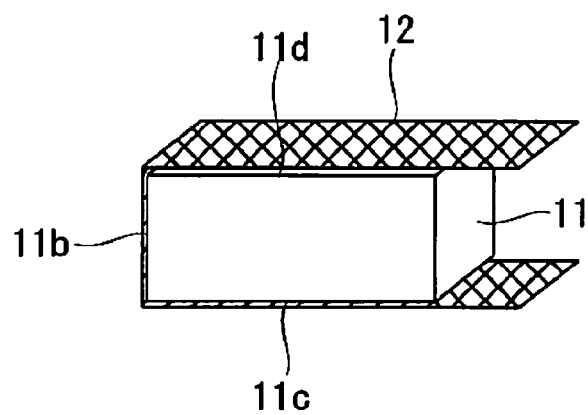
FIG. 5b is a perspective view for explaining a positional relation between the anode body and the anode lead of the second modification of the solid electrolytic capacitor.
Figure 6A:
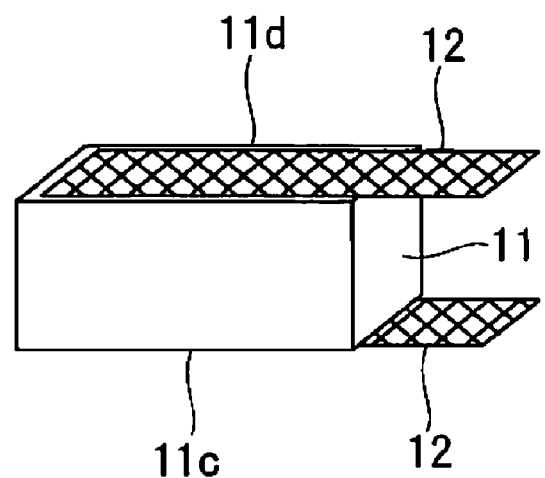
FIG. 6a is a perspective view for explaining the positional relation between the anode body and the anode lead of a first other example of the second modification of the solid electrolytic capacitor.

FIG. 5a is a cross-sectional view of a second modification of the solid electrolytic capacitor, while FIG. 5b is a perspective view for explaining a positional relation between the anode body 11 and the anode lead 12 of this solid electrolytic capacitor. FIG. 5b only shows the anode body 11 of the capacitor element 1 and the metal mesh shown in FIG. 5a. FIGS. 6a to 7 to be described later show the same.

In the solid electrolytic capacitor described above, the metal plate or the metal mesh which is to be the anode lead 12 is in contact only with the top surface of the anode body 11 (see FIG. 2 or 4). However, as shown in FIGS. 5a and 5b, it is also possible that the metal mesh folded so as to have a recessed shape is in contact with the top surface 11d, a bottom surface 11c, and a rear surface 11b of the anode body 11. Here, the anode terminal 3 is connected to both ends of the metal mesh as shown in FIG. 5a.

FIG. 6a is a perspective view for explaining the positional relation between the anode body 11 and the anode lead 12 of a first other example of the second modification of the solid electrolytic capacitor. As shown in FIG. 6a, it is possible that two metal meshes are in contact with the top surface 11d and the bottom surface 11c of the anode body 11.

Figure 6B:
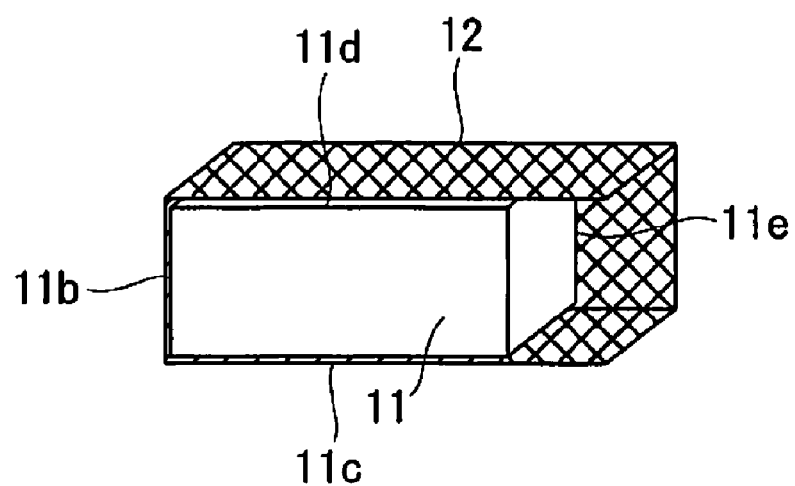
FIG. 6b is a perspective view for explaining the positional relation between the anode body and the anode lead of a second other example of the second modification of the solid electrolytic capacitor.
Figure 7:
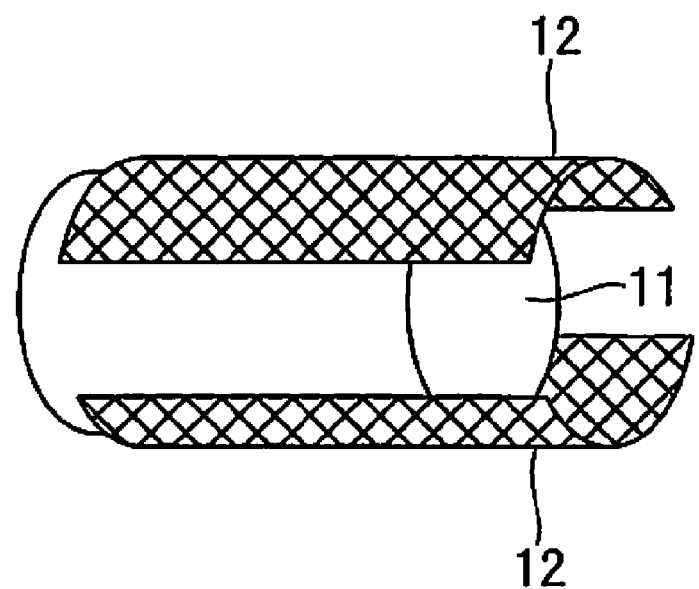
FIG. 7 is a perspective view for explaining the positional relation between the anode body and the anode lead of a third other example of the second modification of the solid electrolytic capacitor.

FIG. 6b is a perspective view for explaining the positional relation between the anode body 11 and the anode lead 12 of a second other example of the second modification of the solid electrolytic capacitor. As shown in FIG. 6b, it is possible that the metal mesh is in contact with each of the top surface 11d, the bottom surface 11c, the rear surface 11b, and a side surface 11e of the anode body 11.

The arrangement of the metal mesh (the anode lead 12) is not limited to these, but various arrangements are possible. For example, the metal mesh may be in contact with the entire outer surface of the anode body 11. Also in the case where the metal plate provided with the plurality of through-holes 121 is used as the anode lead 12, various arrangements are possible.

FIG. 7 is a perspective view for explaining the positional relation between the anode body 11 and the anode lead 12 of a third other example of the second modification of the solid electrolytic capacitor. As shown in FIG. 7, it is possible that the anode body 11 has a cylindrical shape so that the anode lead 12 is in contact with a side surface of the cylindrical anode body 11.

Thus, by forming the anode lead 12 on a large region of the outer surface of the anode body 11, the high frequency characteristic of the ESR can be improved further. Also, since the electrical connection state between the anode body 11 and the anode lead 12 becomes more preferable, the ESR is reduced.

Figure 8A:
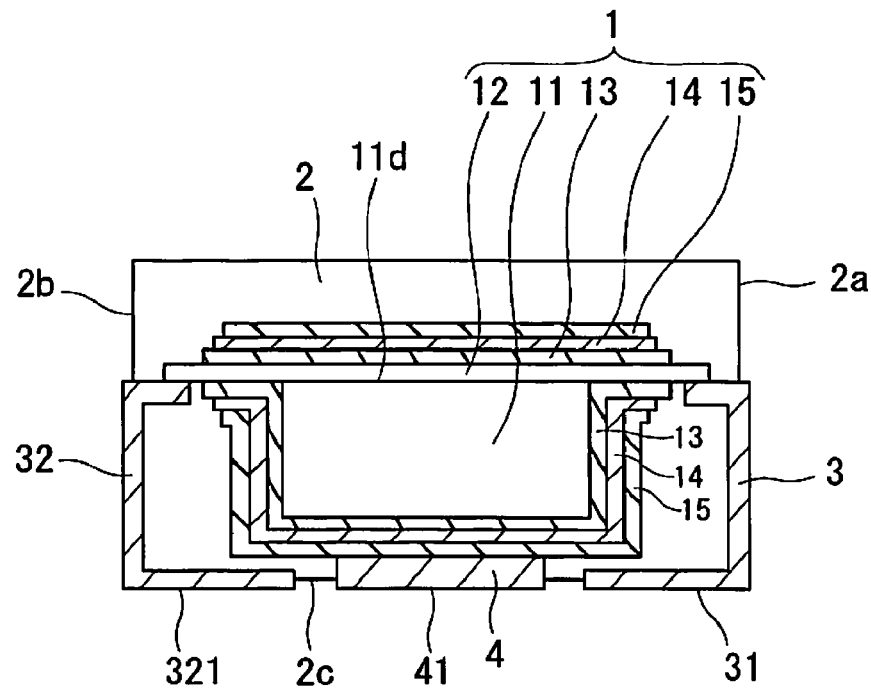
FIG. 8a is a cross-sectional view showing a solid electrolytic capacitor having a three terminal structure which is a third modification of the solid electrolytic capacitor.
Figure 8B:
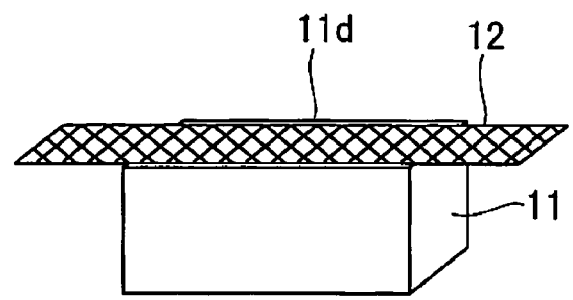
FIG. 8b is a perspective view for explaining the positional relation between the anode body and the anode lead of the third modification of the solid electrolytic capacitor.

FIG. 8a is a cross-sectional view showing a solid electrolytic capacitor having a three terminal structure which is a third modification of the solid electrolytic capacitor, while FIG. 8b is a perspective view for explaining the positional relation between the anode body 11 and the anode lead 12 of the third modification of the solid electrolytic capacitor. FIG. 8b only shows the anode body 11 of the capacitor element 1 and the metal mesh shown in FIG. 8a. FIGS. 9b and 10b to be described later show the same.

As shown in FIGS. 8a and 8b, the solid electrolytic capacitor described above may have the three terminal structure. In particular, an anode terminal 32 which is different from the anode terminal 3 is connected to the anode lead 12 in contact with the top surface 11d of the anode body 11. The anode terminal 32 is extracted to the rear surface 2b of the exterior resin 2, passes along the rear surface 2b of the exterior resin 2 and extends to the bottom surface 2c of the exterior resin 2. An anode terminal surface 321 of the anode terminal 32 is thereby exposed from the bottom surface 2c of the exterior resin 2. A cathode terminal surface 41 of the cathode terminal 4 is exposed from the bottom surface 2c of the exterior resin 2 at a position between the anode terminal 3 and the anode terminal 32.

Figure 9A:
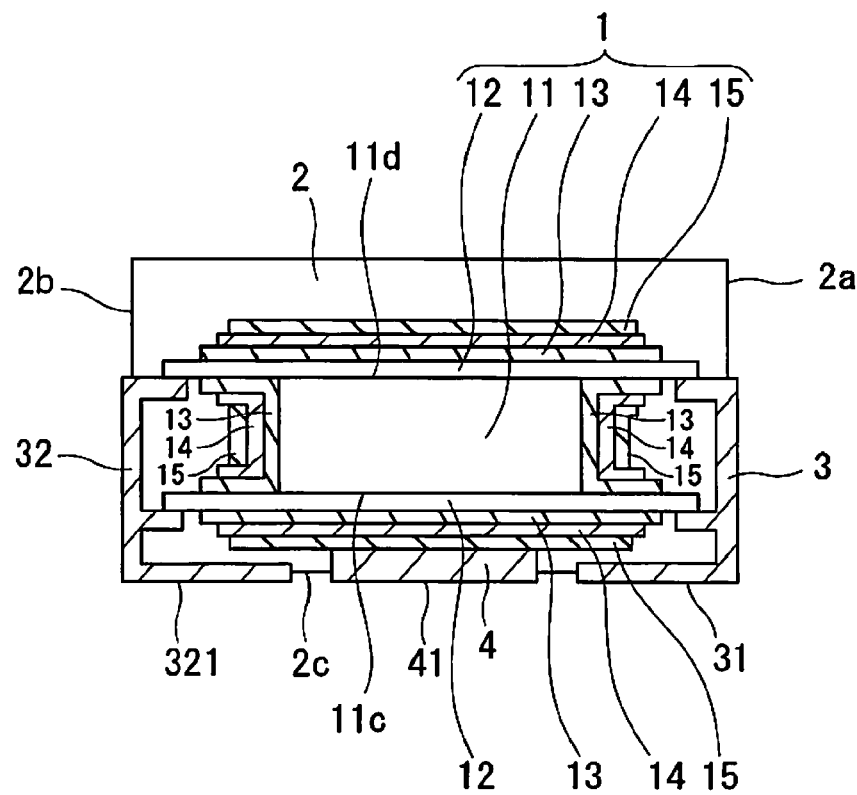
FIG. 9a is a cross-sectional view of a first other example of the third modification of the solid electrolytic capacitor.
Figure 9B:
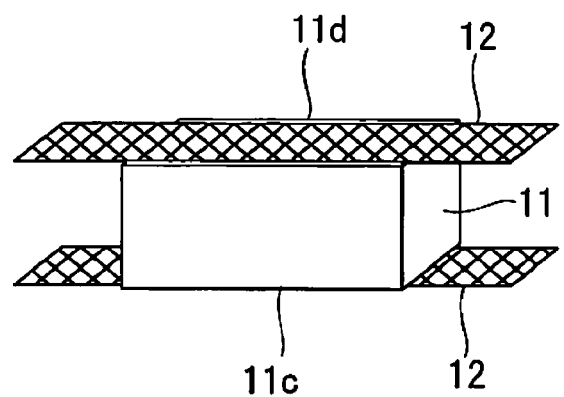

FIG. 9a is a cross-sectional view of a first other example of the third modification of the solid electrolytic capacitor, while FIG. 9b is a perspective view for explaining the positional relation between the anode body 11 and the anode lead 12 of this solid electrolytic capacitor.

As shown in FIGS. 9a and 9b, it is possible that the anode lead 12 is in contact with each of the top surface 11d and the bottom surface 11c of the anode body 11, and the anode terminal 3 and the anode terminal 32 are connected to the anode leads 12. The connection arrangement of the anode lead 12 and the anode terminals 3, 32 is not limited to this. For example, the anode terminals 3, 32 may be connected to each of the two anode leads 12.

Figure 10A:
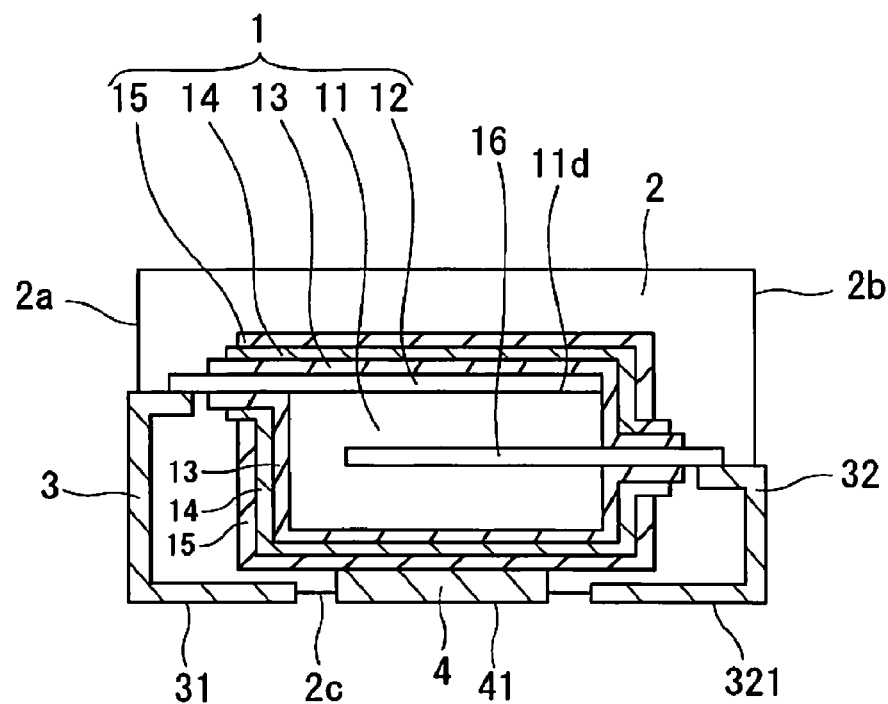
FIG. 10a is a cross-sectional view of a second other example of the third modification of the solid electrolytic capacitor.
Figure 10B:
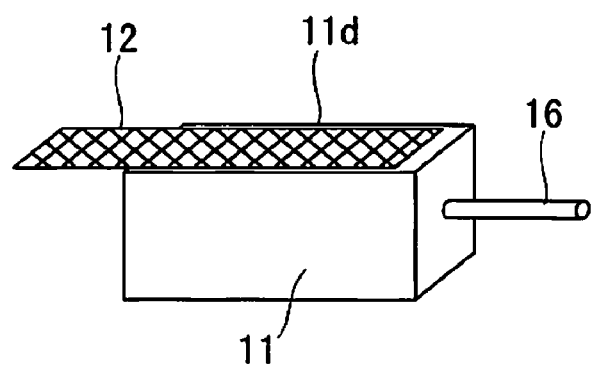

FIG. 10a is a cross-sectional view of a second other example of the third modification of the solid electrolytic capacitor, while FIG. 10b is a perspective view for explaining the positional relation of the anode body 11, the anode lead 12, and an embedded anode lead of this solid electrolytic capacitor.

As shown in FIGS. 10a and 10b, it is possible that, instead of connecting the two anode terminals 3, 32 to the anode lead 12, an anode lead 16 extracted from the anode body 11 is provided to the capacitor element 1, and the anode terminal 32 is connected to the anode lead 16 to form the solid electrolytic capacitor having the three terminal structure.

In the third modification of the solid electrolytic capacitor having the three terminal structure, the ESR is reduced more than in the solid electrolytic capacitor having a two terminal structure.

Table 4 shows results of an experiment for verification of effects described above. In this verification experiment, prepared were 20 each of samples D1, D2 of the solid electrolytic capacitor having the three terminal structure shown in FIGS. 8a and 8b, and sample D3 of the solid electrolytic capacitor shown in FIGS. 10a and 10b. In the sample D1, the perforated metal plate is used for the anode lead 12. The perforated metal plate has a thickness of 0.1 mm, a through hole diameter of 1 mm, and the aperture ratio of 60%. In the sample D2, the metal mesh formed by a wire having a diameter of 0.1 mm is used for the anode lead 12.

For each of the samples D1 to D3, measured were the capacitance, leakage current, ESR, and yield ratio. The measuring conditions of the capacitance, leakage current, ESR, and yield ratio are the same as those in the measurement for the samples A1 to A7 discussed above.

The result shows that, as shown in Table 4, the ESRs of all the samples D1 to D3 are significantly lower compared to that in the solid electrolytic capacitor having the two terminal structure (see Tables 1 to 3).

TABLE 4

| | CAPACITANCE | LEAKAGE CURRENT | ESR | YIELD RATIO |
|---|---|---|---|---|
| SAMPLE D1 | 1.1 | 0.85 | 0.6 | 0.9 |
| SAMPLE D2 | 1.1 | 0.85 | 0.6 | 0.9 |
| SAMPLE D3 | 1.1 | 0.9 | 0.6 | 0.9 |

The present invention is not limited to the first embodiment in construction but can be modified variously within the technical range set forth in the appended claims. For example, for the anode lead 12, not only the metal mesh and the metal plate provided with the through-holes 121, various things may be used as long as they are provided with a plurality of openings and can be in contact with the outer surface of the anode body 11 with the openings opening toward the anode body 11.

Second Embodiment

The solid electrolytic capacitor according to a second embodiment of the present invention comprises a capacitor element 1, an exterior resin 2 covering the capacitor element 1, an anode terminal 3, and a cathode terminal 4, in a similar manner to that in the solid electrolytic capacitor of the first embodiment shown in FIG. 1. However, the anode lead 12 of the capacitor element 1 of the solid electrolytic capacitor of this embodiment has a different structure from that of the solid electrolytic capacitor of the first embodiment. Structures of other elements and the manufacturing method are the same as those in the first embodiment, and therefore, the description is omitted.

Figure 11:
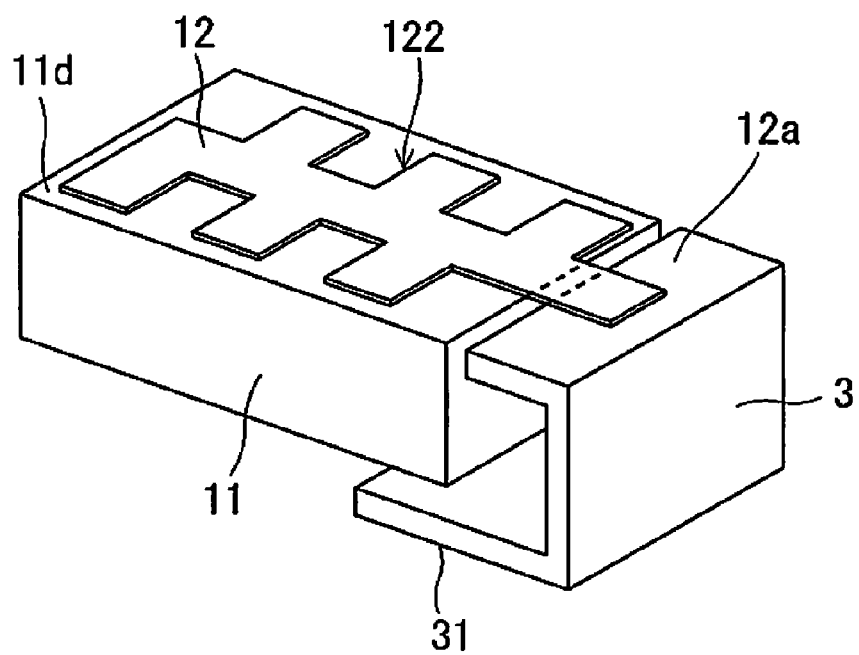
FIG. 11 is a perspective view of the anode body, the anode lead, and the anode terminal of the solid electrolytic capacitor according to a second embodiment of the present invention.

FIG. 11 is a perspective view of the anode body 11, the anode lead 12, and the anode terminal 3 of the solid electrolytic capacitor of this embodiment. FIG. 11 shows the solid electrolytic capacitor without showing the dielectric layer 13, the electrolyte layer 14, the cathode layer 15, the exterior resin 2, or the cathode terminal 4.

As shown in FIG. 11, the anode lead 12 is formed by a metal plate made of the valve metal provided with a plurality of cutouts 122 on an outer circumference edge thereof. In particular, the plurality of cutouts 122 are defined on either side edge of the metal plate extending in the longitudinal direction of the metal plate, in a recessed shape toward the center of the metal plate. The positions of the plurality of cutouts 122 defined on one side edge and the positions of the plurality of cutouts 122 defined on the other side edge are shifted relatively to each other.

The anode body 11 and the anode lead 12 are formed in a manner described below. A valve metal powder is molded into a rectangular parallelepiped. And then, the metal plate provided with the cutouts 122 comes into contact with a top surface of a compact thereby obtained, and the compact is sintered in this state. The porous sintered body which is to be the anode body 11 is thereby formed, and also, thereby obtained is a sintered body including the metal plate which is to be the anode lead 12 coupled to a top surface of the porous sintered body in a highly adhesive state (see FIG. 12a).

Also in the solid electrolytic capacitor of this embodiment, in a similar manner to that in the first embodiment, the adhesion between the anode body 11 and the anode lead 12 is enhanced, and therefore, the anode terminal 3 connected to the anode lead 12 and the anode body 11 are in a preferable connection state. Accordingly, the leakage current and the equivalent series resistance (ESR) are reduced compared to those of the conventional solid electrolytic capacitor.

Figure 12A:
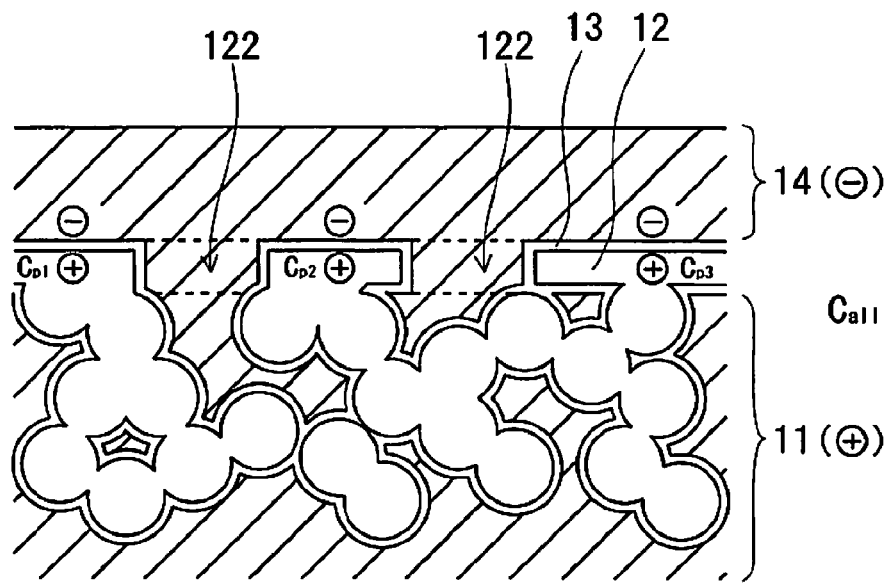
FIG. 12a is an enlarged cross-sectional view of a part of a capacitor element of the solid electrolytic capacitor according to the second embodiment.
Figure 12B:
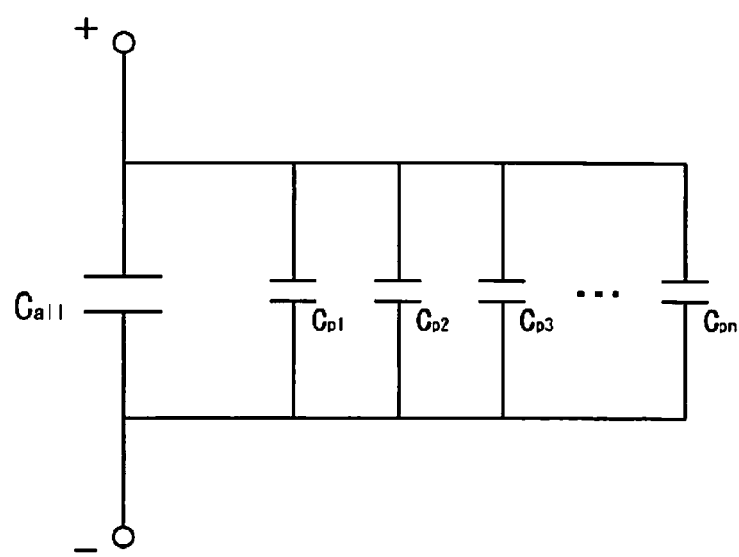
FIG. 12b is an equivalent circuit schematic of the capacitor element shown in FIG. 11.

Also, between the anode lead 12 and the electrolyte layer 14, generated is the plurality of capacity components $C_{p1}$, $C_{p2}$, ..., and $C_{pn}$ which exhibit high flatness of the electrode (see FIG. 12a). Therefore, the high frequency characteristic of the ESR is improved by these capacity components $C_{p1}$, $C_{p2}$, ..., and $C_{pn}$.

In the solid electrolytic capacitor of this embodiment, the electrolyte of the electrolyte layer 14 formed on the anode lead 12 passes through the cutouts 122 of the anode lead to penetrate inside of the anode body 11 formed by the porous sintered body, and therefore, the electrolyte layer is uniformly formed also on the surface of the dielectric layer formed inside the porous sintered body (see FIG. 12a). Thus, the ESR can be reduced compared to that in the case where the cutouts 122 are not provided to the anode lead 12, or the case where the cutouts 122 are blocked by an insulating material or the like.

Figure 14:
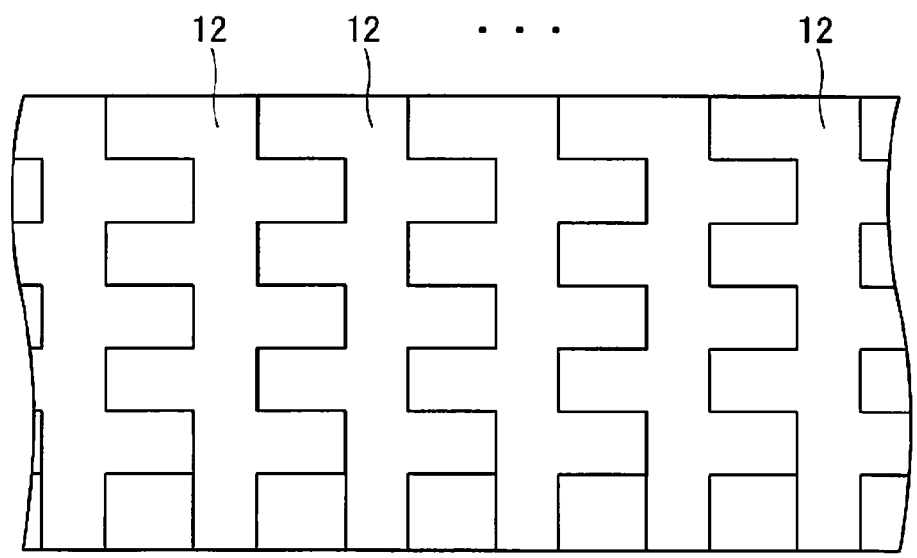
FIG. 14 is a plain view for explaining a cutting shape for cutting out the anode lead shown in FIG. 13 from one metal plate member.

FIG. 14 is a plain view for explaining a cutting shape for cutting out the anode lead 12 from one metal plate member. As shown in FIG. 14, when the plurality of anode leads 12 having the shape described above are cut out from one metal plate member, the recessed and protruded cutting shape defined on the plate member by cutting out one anode lead 12 can be used without change as the shape of another anode lead 12. Therefore, it is possible to efficiently cut out the plurality of anode leads 12 from one plate member, resulting in a decrease in the manufacturing cost of the anode lead 12.

Table 5 shows results of an experiment for optimizing the solid electrolytic capacitor described above. In this optimization experiment, prepared were 20 each of samples E1 to E10 of the solid electrolytic capacitor of this embodiment shown in FIG. 11, and comparative samples X. For each of the samples, measured were the capacitance, leakage current, ESR, and yield ratio. The measuring conditions are the same as those in the optimization experiment carried out in the first embodiment. The values shown in Table 5 are obtained by normalizing the average values of the non-defective products by the measurement values of the comparative samples X in a similar manner to those in Table 1 and the like. Accordingly, as the capacitance becomes higher than one, or as the leakage current and ESR become lower than one, the properties improve.

Figure 13:
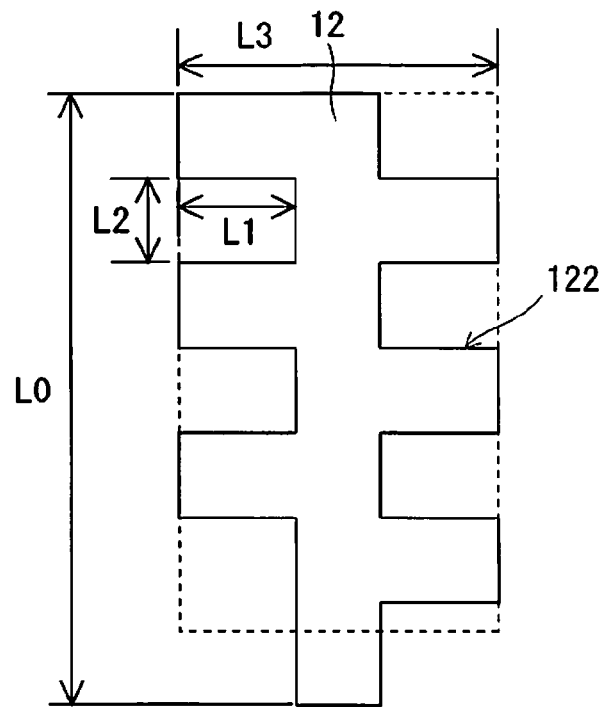
FIG. 13 is a plain view of the anode lead shown in FIG. 11.

In the samples E1 to E10, for the anode leads 12, used was a metal plate made of niobium having a thickness of 0.1 mm and a shape shown in FIG. 11. The samples E1 to E10 are of 10 kinds in which entire lengths L0 and L3 of the metal plate made of niobium and a depth L1 of the cutouts 122 having a recessed shape are constant, and a width L2 of the cutouts 122 having a recessed shape varies (see FIG. 13). In particular, the length L0 is 11 mm, the length L1 is 2.6 mm, and the length L3 is 6.0 mm. And a ratio of a total area of the cutouts 122 provided to the metal plate made of niobium to an area of a region of the outer surface of the anode body 11 with which the metal plate made of niobium is in contact is hereinafter referred to as a cutout ratio. The cutout ratio is 80% in the sample E1 (L2 is around 2.8 mm), 75% in the sample E2 (L2 is around 2.6 mm), 70% in the sample E3 (L2 is around 2.4 mm), 60% in the sample E4 (L2 is around 2.1 mm), 50% in the sample E5 (L2 is around 1.7 mm), 40% in the sample E6 (L2 is around 1.4 mm), 30% in the sample E7 (L2 is around 1.0 mm), 20% in the sample E8 (L2 is around 0.7 mm), 10% in the sample E9 (L2 is around 0.3 mm), and 5% in the sample E10 (L2 is around 0.1 mm). Here, the area of the region of the outer surface of the anode body 11 with which the metal plate made of niobium is in contact is an area of the region in contact with the outer surface of the anode body 11 among the smallest rectangles surrounding the anode lead 12 (a region indicated by a dotted line in FIG. 13), while the total area of the cutouts 122 provided to the metal plate is the sum of areas (L1 multiplied by L2) of all the cutouts 122 (including the cutout at an end) existing in said region in contact with the outer surface of the anode body 11.

Other processes for preparing the samples E1 to E10 are the same as those for the samples A1 to A7 used in the optimization experiment in the first embodiment.

Results of the experiment of the samples E1 to E10 are discussed below.

Comparison of the experiment result of the samples E1 to E10 and the experiment result of the comparative samples X shows that when the cutout ratio of the anode lead 12 is 10% or higher and 75% or lower, the capacitance is the same as or higher compared to the capacitance of the comparative samples X. It can be thought that this is because the electrolyte layer was formed deeper inside the porous sintered body due to the higher cutout ratio of the anode lead 12, and as a result, a capacity appearance rate increased.

Comparison of the experiment result of the samples E1 to E10 and the experiment result of the comparative samples X also shows that when the cutout ratio of the anode lead 12 is 10% or higher and 75% or lower, the leakage current and the ESR are lower compared to those of the comparative samples X. It can be thought that this is because the improved adhesion between the anode lead 12 and the anode body 11 was obtained due to the higher cutout ratio of the anode lead 12.

Further, the result shows that when the cutout ratio of the anode lead 12 is 40% or higher and 60% or lower, the capacitance is higher and the leakage current and the ESR are lower compared to those in the case where the cutout ratio is lower than 40% or higher than 60%.

The reason of the lower leakage current also includes the fact that it was easier for the stress generated on the anode lead 12 in the manufacturing process to be relaxed by the cutouts 122 due to the higher cutout ratio of the anode lead 12, and as a result, the defect hardly occurred on the dielectric layer 13.

The reason of the lower ESR also includes the fact that due to the higher cutout ratio of the anode lead 12, it was easier for the electrolyte of the electrolyte layer 14 to pass through the cutouts 122 of the anode lead 12 to penetrate inside of the anode body 11 formed by the porous sintered body, and as a result, it became easier for the electrolyte layer to be uniformly formed on the surface of the dielectric layer formed inside the porous sintered body.

The experiment result of the sample E1 shows that in the case where the cutout ratio of the anode lead 12 is 80%, the values of the capacitance, the leakage current and the ESR are the same as those of the comparative samples X, however, the yield ratio is significantly lower compared to that of the comparative samples X. It can be thought that this is because the strength of the anode lead 12 itself decreased, and as a result, the anode lead 12 was deformed by the mechanical load generated in the manufacturing process of the solid electrolytic capacitor.

The experiment result of the sample E10 shows that in the case where the cutout ratio of the anode lead 12 is 5%, the capacitance is lower compared to that of the comparative samples X. It can be thought that this is because it was harder for the electrolyte of the electrolyte layer 14 to penetrate inside of the anode body 11, and as a result, it became harder for the electrolyte layer to be formed on the surface of the dielectric layer formed inside the porous sintered body.

TABLE 5

| | CUTOUT RATIO (%) | CAPACITANCE | LEAKAGE CURRENT | ESR | YIELD RATIO |
|---|---|---|---|---|---|
| SAMPLE E1 | 80 | 1.0 | 1.0 | 1.0 | 0.7 |
| SAMPLE E2 | 75 | 1.05 | 0.95 | 0.9 | 0.9 |
| SAMPLE E3 | 70 | 1.1 | 0.9 | 0.85 | 0.9 |
| SAMPLE E4 | 60 | 1.15 | 0.85 | 0.8 | 0.95 |
| SAMPLE E5 | 50 | 1.15 | 0.85 | 0.8 | 0.95 |
| SAMPLE E6 | 40 | 1.15 | 0.85 | 0.8 | 0.95 |
| SAMPLE E7 | 30 | 1.1 | 0.9 | 0.85 | 0.9 |
| SAMPLE E8 | 20 | 1.05 | 0.9 | 0.9 | 0.9 |
| SAMPLE E9 | 10 | 1.0 | 0.95 | 0.9 | 0.9 |
| SAMPLE E10 | 5 | 0.9 | 1.0 | 1.0 | 0.9 |
| COMPARATIVE SAMPLE X | 0 | 1.0 | 1.0 | 1.0 | 0.9 |

Figure 15:
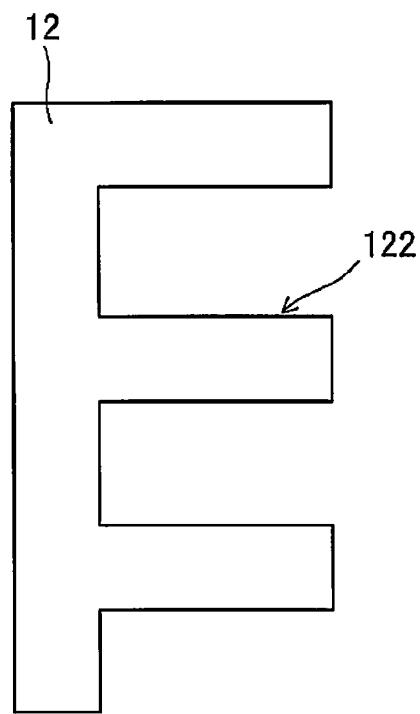
FIG. 15 is a plain view showing the anode lead of the first modification of the solid electrolytic capacitor according to the second embodiment.

FIG. 15 is a plain view showing the anode lead 12 of the first modification of the solid electrolytic capacitor described above. As shown in FIG. 15, the anode lead 12 may be provided with the cutouts 122 only on one side edge of two side edges of the metal plate extending in the longitudinal direction thereof.

Figure 16:
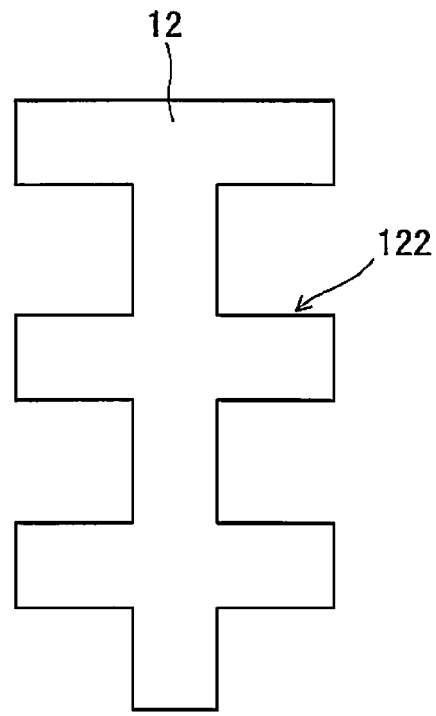
FIG. 16 is a plain view showing the anode lead of the second modification of the solid electrolytic capacitor according to the second embodiment.

FIG. 16 is a plain view showing the anode lead 12 of the second modification of the solid electrolytic capacitor described above. As shown in FIG. 16, the anode lead 12 may be provided with the plurality of cutouts 122 on both side edges of the metal plate extending in the longitudinal direction thereof, so that the plurality of cutouts 122 defined on one side edge and the plurality of cutouts 122 defined on the other side edge are arranged to be opposed to each other.

The present invention is not limited to the second embodiment described above in construction but can be modified variously within the technical range set forth in the appended claims. For example, the shape of the anode lead 12 provided with the cutouts 122 is not limited to those described above, but various shapes may be employed.

In the second embodiment described above, the anode lead 12 is provided with the plurality of cutouts 122. However, the number of cutouts 122 may be one.

What is claimed is:
1. A solid electrolytic capacitor comprising:
an anode body,
an anode lead in direct contact with an outer surface of the anode body,
a dielectric layer formed on a surface of the anode lead,
and a cathode layer formed on a surface of the dielectric layer,
the anode lead being formed with a plurality of openings passing through the anode lead,
wherein the anode lead is in close contact with most part of the largest surface of outer surfaces of the anode body, and
wherein a ratio of a total area of the plurality of openings formed on the anode lead to an area of a region of the outer surface of the anode body with which the anode lead is in close contact is 25% or higher and 90% or lower.

2. The solid electrolytic capacitor according to claim 1, wherein the anode lead comprises a metal mesh or a metal plate formed with a plurality of through-holes.

3. The solid electrolytic capacitor according to claim 1, wherein the openings are arranged in a triangle lattice form.

4. The solid electrolytic capacitor according to claim wherein a plurality of anode terminals are electrically connected to the anode lead, while a cathode terminal is electrically connected to the cathode layer.

5. A solid electrolytic capacitor comprising:
an anode body,
an anode lead in direct contact with an outer surface of the anode body,
a dielectric layer formed on a surface of the anode lead, and
a cathode layer formed on a surface of the dielectric layer,
the anode lead being formed with a cutout on an outer circumference edge of the anode lead,
wherein a close contact region of the anode lead is most part of the largest surface of outer surfaces of the anode body, and
wherein a ratio of a total area of the cutout formed on the anode lead to an area of the region of the outer surface of the anode body with which the anode lead is in close contact is 10% or higher and 75% or lower.

6. The solid electrolytic capacitor according to claim 5, wherein said ratio of the total area of the cutout is 40% or higher and 60% or lower.

7. A method for manufacturing a solid electrolytic; capacitor comprising the steps of:
forming an anode body including an outer surface with which an anode lead provided with a plurality of openings is in direct contact;
forming a dielectric layer on a surface of the anode lead; and
forming an electrolyte layer on a surface of the dielectric layer,
wherein the anode lead is in close contact with most part of the largest surface of outer surfaces of the anode body, and
wherein a ratio of a total area of the plurality of openings formed on the anode lead to an area of a region of the outer surface of the anode body with which the anode lead is in contact is 25% or higher and 90% or lower.

* * * * *

UNITED STATES PATENT AND TRADEMARK OFFICE
CERTIFICATE OF CORRECTION

Page 1 of 1

PATENT NO. : 8,213,161 B2
APPLICATION NO. : 12/608381
DATED : July 3, 2012
INVENTOR(S) : Koichi Nishimura et al.

It is certified that error appears in the above-identified patent and that said Letters Patent is hereby corrected as shown below:

In Column 18, Lines 64-67 of Claim 4, should read:

4. The solid electrolytic capacitor according to claim 1, wherein a plurality of anode terminals are electrically connected to the anode lead, while a cathode terminal is electrically connected to the cathode layer.

Signed and Sealed this
Twenty-first Day of August, 2012

David J. Kappos
*Director of the United States Patent and Trademark Office*